Aug. 21, 1934. E. V. CROWELL Re. 19,278

WELL CEMENTING APPARATUS

Original Filed March 1, 1927

INVENTOR.
Erd V. Crowell,

BY R. W. Smith
ATTORNEY.

Reissued Aug. 21, 1934

Re. 19,278

UNITED STATES PATENT OFFICE 19,278

WELL CEMENTING APPARATUS

Erd V. Crowell, Los Angeles, Calif.

Original No. 1,828,098, dated October 20, 1931, Serial No. 171,851, March 1, 1927. Application for reissue November 14, 1932, Serial No. 642,617

11 Claims. (Cl. 166—1)

This invention is an improvement in the method and apparatus for cementing wells disclosed in Letters Patent of the United States of America Number 1,732,791, for Well cementing, granted to me October 22, 1929; and it is the object of the present invention to provide for carrying on drilling operations or circulating a washing medium through the unobstructed bore of a string of casing in a well, and then forcing a cementing mixture downwardly through the casing to any predetermined level and thence outwardly through ports in the casing to fill the surrounding bore.

In practice it has been found advantageous to have the full bore of a string of casing available when carrying on drilling operations or washing down the string of casing, and it is also desirable when circulating a washing medium preparatory to a cementing operation, to utilize the full bore of the casing and circulate the washing medium downwardly through the entire string of casing around its lower end and thence upwardly in the surrounding well bore.

It is therefore the particular object of the present invention to provide a string of casing with an unobstructed bore and normally closed valve controlled peripheral ports whereby the casing is adapted for flow of a circulating medium downwardly through its unobstructed bore past the closed ports and around the lower end of the casing and thence upwardly in the surrounding well bore, the casing being arranged to anchor a plug which is lowered in the casing in back of the washing medium, with said plug anchored immediately below the peripheral ports so that a subsequently introduced cementing mixture is prevented from flowing downwardly through the casing below the plug and consequently forces open the normally closed valves controlling the ports to permit discharge of the cementing mixture into the surrounding well bore.

It is a further object of the invention to employ a traveling plug in conjunction with the anchored plug, the traveling plug being forced down the well casing in back of the quantity of cement which is to be discharged into the surrounding well bore so as to force the cement through the peripheral ports of the well casing; and the traveling plug being arrested by seating on the anchored plug, indicates that all of the cement has been forced through the peripheral ports into the surrounding bore and also closes the peripheral ports against back flow of the cement into the bore of the casing.

It is a still further object of the invention to provide the normally closed discharge ports in a fixed section of the string of casing which may be either an intermediate barrel section or a shoe at the lower end of the string, with said barrel or shoe section forming the means for engaging the lower plug so as to automatically anchor it in operative position.

The invention will be readily understood from the following description of the accompanying drawing, in which.

Figure 1:
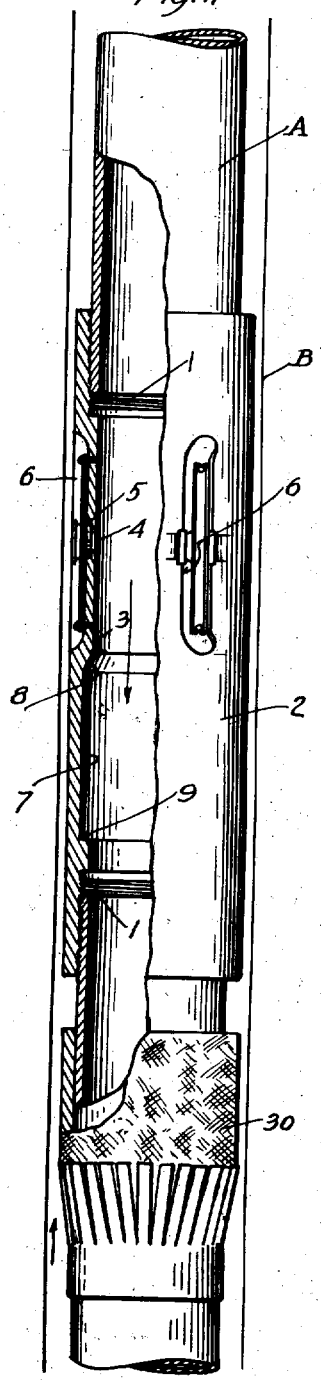
Fig. 1 is a vertical section through a well bore showing a string of casing, partly in axial section, constructed in accordance with the invention and arranged for drilling operations or circulation of a washing medium prior to the cementing operation.

A usual string of casing A is received in the well bore B, and the space in the well bore surrounding the casing may have a washing medium circulated therethrough and is then cemented off to provide a standard well construction. A fixed section of the string of casing, connected thereto by usual threaded connections 1 may form either an intermediate barrel 2 as shown in Figs. 1 and 2, or a shoe 2*a* at the lower end of the string as shown in Fig. 3.

This fixed section of the string of casing has an unobstructed bore 3 forming a continuation of the uniform bore of the string, and peripheral ports 4 open through the fixed section in spaced relation from its lower end. The ports 4 are normally closed by spring pressed valves 5 mounted in grooves 6 in the outer periphery of the ported section, but these valves are adapted to open against the tension of their springs by increased pressure in the bore of the casing so as to permit passage of material from the casing into the surrounding bore.

Figure 2:
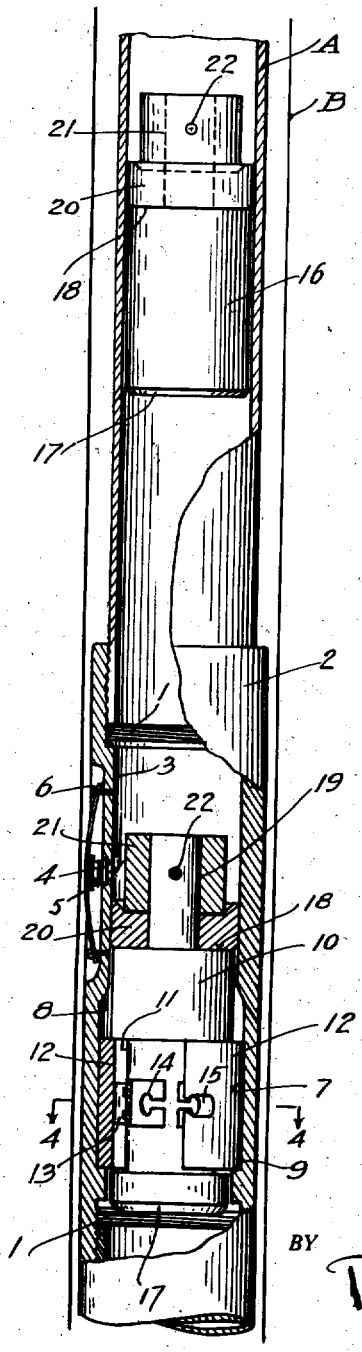
Fig. 2 is a similar view showing the lower plug anchored in the casing and the traveling plug cooperating therewith during the cementing operation.
Figure 3:
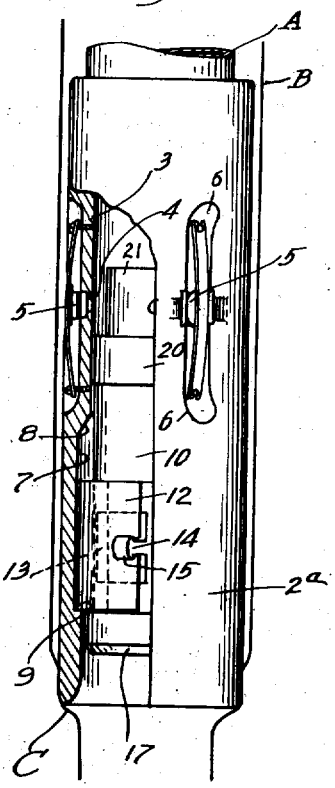
Fig. 3 is a view similar to Fig. 2 but showing a modified construction in which the invention is applicable to a casing shoe rather than an intermediate barrel section of the string.
Figure 4:
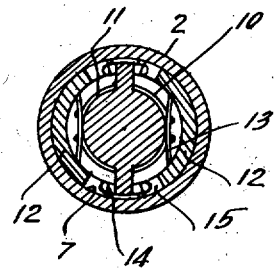
Fig. 4 is a transverse section on the line 4—4 of Fig. 2.

Below the ports 4 the bore of the ported section has an increased diameter forming an elongated annular recess 7 terminating in upper and lower shoulders 8 and 9 formed by continuations of the uniform bore of the string of casing; and the lower shoulder 9 forms a seat for a plug 10 adapted for expansion into recess 7, while the upper shoulder 8 is preferably inclined as shown in Figs. 2 and 3 to permit ready expansion of the plug when it is lowered through the bore of the casing to the level of the recess.

In order to provide anchoring means for plug 10 in recess 7 the plug has an intermediate reduced diameter 11 adapted to receive arcuate locking slips 12 which are adapted to contract wholly within the outer periphery of the plug. Bias springs 13 fixed to the plug in back of the slips engage the latter so as to tend to expand the same beyond the periphery of the plug and expansion of the slips is preferably guided and limited by abutments 14 on the plug engaging in notches 15 in the slips. As the plug is lowered through casing A the uniform bore of the latter contracts the slips to permit free passage of the plug, and when the plug is opposite recess 7, the annular enlargement formed thereby permits springs 13 to expand the slips so that they rest on shoulder 9 and thereby anchor the plug.

Packing is preferably mounted on the plug to insure a tight shutting-off of the casing when the plug is anchored in recess 7, the parts being so arranged that when the plug is anchored its packing closes the bore of the casing just below ports 4. As a consequence a cementing mixture introduced into the well casing above the anchored plug is prevented from flowing down the casing past the plug and thereby forces valves 5 open for discharge of the cement through the ports 4 into the surrounding well bore.

A predetermined supply of the cementing mixture is preferably thus discharged through ports 4, the quantity of cement being measured by a traveling plug 16 lowered in the well casing in back of the cementing mixture. The traveling plug slides freely in the uniform bore of the casing and is preferably provided with packing to prevent leakage of the cementing material past the plug.

The lower ends of plugs 10 and 16 are preferably tapered as shown at 17 to guide the plugs through the bore of the casing, and the packing for the plugs may be mounted on annular shoulders 18 formed at the upper ends of the plugs by reducing their diameter as shown at 19. The packing is preferably annular cup-packing 20 snugly engaging the casing wall and fixed against shoulders 18 by followers 21 which may be held in place by pins 22.

In operation the section of the string of casing which is provided with ports 4 and recess 7, may form either an intermediate barrel 2 in the string or a shoe 2*a* at the lower end of the string, depending upon whether the well is to be cemented at an intermediate level or at the formation seat C.

The well casing thus presents a uniform unobstructed bore prior to the lowering of plug 10, with ports 4 closed by their spring seated valves 5. The casing may be washed down or drilling may be continued through the casing with the unobstructed bore permitting freedom of such operations; and said washing operation may be by the various methods disclosed and claimed in Letters Patent of the United States of America, Number 1,828,100, for Method of cementing wells, granted to me October 20, 1931. Thus, for example, when it is desired to circulate a washing medium, the casing may rest upon the formation seat so that the washing fluid forced downwardly through the casing will open valves 5 and thus flow outwardly through the valves and upwardly in the surrounding bore, or the casing may be elevated slightly from the formation seat so that the washing medium will flow downwardly through the unobstructed bore of the casing past the spring-closed valves 5 as shown in Fig. 1 and thence around the lower end of the casing and upwardly in the surrounding bore.

The washing medium may be forced downwardly through the casing by the plug 10 being lowered through the casing in back of the washing medium, the plug being preferably forced downwardly by a cementing mixture introduced into the casing above the plug; and when the plug has been lowered so that all of the washing fluid has been discharged and the plug has been automatically anchored in recess 7 immediately below ports 4 as shown in Fig. 2, the casing if it has been raised from the formation seat for circulation around its lower end is again lowered to the formation seat when employing the shoe 2*a*, or may be suspended at any desired level with the well bore packed-off below barrel 2 by suitable packing 30, which during the washing operation remains in normal contracted position as shown in Fig. 1 to permit passage of the washing medium, but which when a cementing mixture is discharged through ports 4 is expanded by the weight of the cementing mixture so as to tightly engage the well of the well bore and thereby pack-off the bore in accordance with usual practice.

The desired quantity of the cementing mixture is accurately measured by lowering the plug 16 into the casing in back of the predetermined quantity of cement as shown in Fig. 2, the plug 16 being forced downwardly against the cementing mixture by a suitable flow of water so that the pressure opens valves 5 for discharge of the cementing material through the ports 4 and into the surrounding well bore above either the formation seat C or the packing 30, depending upon the use of either shoe 2*a* or barrel 2.

When all of the cement is discharged, plug 16 is arrested by abutment against anchored plug 10, thereby indicating that the cementing operation is completed; and with the parts in this position the cement is prevented from back-flow into the casing, not only by the closing of valves 5, but also by the plug 16 closing the bore of the casing to ports 4.

I have thus provided a construction which permits drilling operations or circulation of a washing medium through an unobstructed casing bore, with subsequent automatic anchoring of a plug in the bore, and flow of cementing material downwardly through the casing until it is stopped by the plug and thence outwardly through the casing to fill the surrounding well bore.

I claim:

1. Well casing having an unobstructed open bore throughout its length, a lateral port in the casing, the unobstructed open bore of the casing being recessed below the port with said recess forming a seat, a plug slidable in the bore of the casing and adapted for expansion in the recess to anchor the plug on the seat so as to shut off the entire bore of the casing below the port and leave the entire bore of the casing unobstructed above the port.

2. Well casing having an opening throughout its length for the passage of fluid under pressure, a lateral port in said casing, the bore of the casing being recessed below the port with said recess forming a seat, a plug slidable in the bore of the casing and carrying means adapted for expansion in the recess to anchor the plug on the seat so as to shut off the entire bore of the casing below the port and leave a longitudinal opening throughout the length of the casing above the port.

3. Well casing having an opening throughout its length for the passage of fluid under pressure, a series of lateral ports in the casing, valvular means controlling said ports, means in the casing and immovable with relation thereto below said ports forming a seat for a plug, a plug slidable in the bore of said casing and adapted to be stopped by said seat so as to shut off the entire bore of the casing below said series of ports and leave an opening throughout the length of the casing above the ports.

4. A well casing having a bore throughout its length to permit the passage of fluid under pressure, a plug slidably mounted in said bore and adapted to be forced downwardly through said casing by fluid pressure, peripheral ports in said casing, and means in said casing, below said peripheral ports, adapted to cooperate with said plug to arrest its downward movement below said ports.

5. A well casing having a ported section, a plug slidably fitting the bore of said casing, fluid pressure means to force said plug downwardly through said casing, and means, not closing the bore of said casing and immovable with respect thereto, to arrest the downward movement of said plug at a predetermined point.

6. A well casing having a ported section, a plug slidably fitting the bore of said casing, fluid pressure means to force said plug downwardly through said casing, and means preserving a longitudinal open bore through said casing and immovable with respect to said casing to arrest the downward movement of said plug at a predetermined point within said casing.

7. A well casing having an opening for the passage of pressure fluid throughout its length, peripheral ports in said casing, a barrier slidable in said casing and adapted to be anchored at a predetermined point therein, and means immovable with respect to said casing to anchor said barrier below said peripheral ports.

8. A well casing, peripheral ports in said casing, a traveling plug slidably fitting said casing, means forming part of said casing and maintaining a bore for the passage of pressure fluid therethrough to anchor said plug below said peripheral ports.

9. A well casing having a bore throughout its length to permit the passage of fluid under pressure, a plug slidably mounted in said bore and adapted to be forced downwardly through said casing by fluid pressure, peripheral ports in said casing, and means in said casing below said peripheral ports and immovable with respect thereto adapted to cooperate with said plug to arrest its downward movement below said ports.

10. A well casing having a conduit throughout its length for the passage of fluid under pressure, a series of peripheral ports in said casing, a barrier slidably fitting the bore of said casing and adapted to be anchored at a predetermined point therein, fluid pressure means to force said barrier downwardly through said casing, and means secured rigidly in said casing to arrest the downward movement of said barrier at a predetermined point within said casing.

11. A well casing having an opening throughout its length for the passage of fluid under pressure, peripheral ports in said casing, valvular means controlling said ports, a plug slidably fitting the bore of said casing, fluid pressure means to force said plug downwardly through said casing, and means immovable with respect to said casing and cooperating with means forming part of said plug to stop the downward course of said plug through said casing at a predetermined point.

ERD V. CROWELL.